Figure 4:
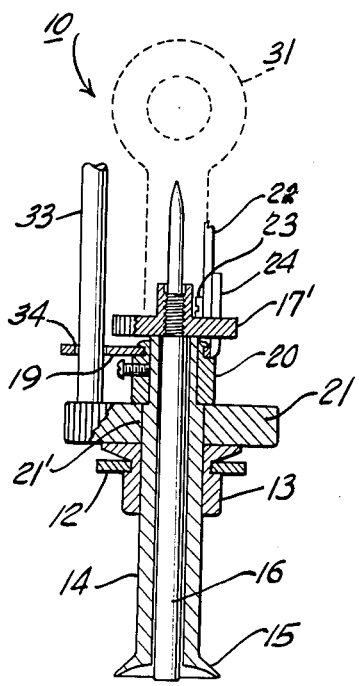

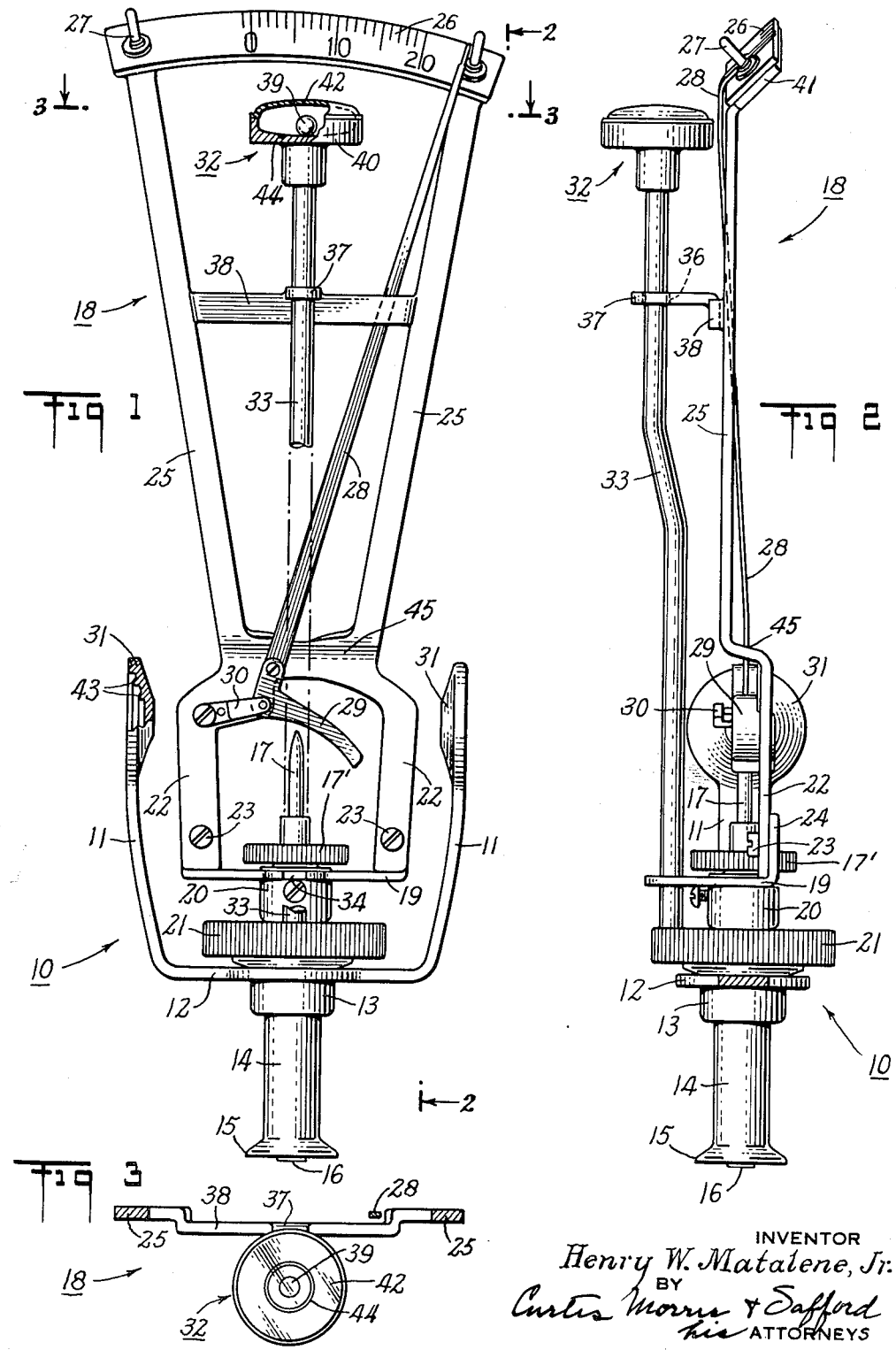

May 3, 1966  H. W. MATALENE, JR  3,248,934
TONOMETERS
Filed Feb. 25, 1963  2 Sheets-Sheet 2

INVENTOR.
HENRY W. MATALENE, JR.
BY
Curtis, Morris & Safford.
ATTORNEYS:

United States Patent Office 3,248,934
Patented May 3, 1966

3,248,934
TONOMETERS
Henry W. Matalene, Jr., 141 E. 44th St.,
New York, N.Y. 10017
Filed Feb. 25, 1963, Ser. No. 260,762
1 Claim. (Cl. 73—80)

The present invention relates to tonometers which are gravity instruments for detecting and measuring the extent of tension or internal pressure in the eyeball commonly occasioned by pathological conditions incident to glaucoma.

In general, an object of the invention has been to provide an instrument capable of supplying more accurate and reliable information regarding pressure conditions in the eye than has heretofore been possible with available known instruments designed for that purpose. The desired results are attained in part by reducing friction at critical points; by facilitating readings on the measuring scale; and by facilitating more accurate positioning of the instrument on the eyeball.

A tonometer of known type, for example, as seen in U.S. Patent No. 2,708,847, comprises in common with others, a handle and pressure indicating means carried on a frame which is rotatably adjustable in and axially slidable in relation to the handle. The frame has a transverse plate at its lower end and a scale at its upper end. A foot plate tube is slidable and rotatable in a bushing secured to the handle; and the upper end of said tube is secured to said transverse plate. A plunger in the tube is positioned to actuate the pointer in a known manner. A difficulty with a tonometer of this type is that it is imperfectly balanced in relation to the plunger axis and hence develops undesired friction in exaggerated degree unless said axis can be maintained in perpendicular relation to a plane tangent to the eyeball surface engaged by the lower end of the plunger. Thus far, operators have had to rely on their keenness of perception to maintain the desired position of the instrument.

A tonometer according to the present invention includes a frame of which the upright member has lower and upper portions disposed in a plane at one side of the longitudinal axis of the instrument and an intermediate portion offset from said lower portion and disposed in a plane at the opposite side of said axis. The device also carries a level indicator positioned to be readily observed by the operator while adjusting the instrument to operative position in relation to an eyeball. With these features, the likelihood of making inaccurate readings due to excessive friction operating on the plunger of the instrument is minimal.

A form of tonometer embodying the present invention is illustrated in the drawings appended hereto and wherein:

FIG. 1 is a front elevation on exaggerated scale;
FIG. 2 is a side elevation partly in vertical section on the line 2—2 of FIG. 1;
FIG. 3 is a top plan view partly in transverse section on the line 3—3 of FIG. 1 of the leveling device carried by the instrument; and
FIG. 4 is a view with parts shown in transverse vertical section.

Referring to said drawings, the tonometer there shown includes a supporting handle 10 having spaced arms 11 extending from a base 12 which has a central opening adapted to receive a short sleeve 13 rotatably mounted therein.

The assembly supported by said handle comprises a cylindrical tube 14 provided at its bottom end with a foot plate 15 and having a central bore, said tube being slidably and rotatably mounted in sleeve 13 with its upper end extending between said arms 11. A plunger 17 slides in said bore, the lower end 16 thereof extending downwardly into the cup-shaped recess provided by the foot plate 15 and the upper end of said plunger 17 extending upwardly beyond the open upper end of tube 14. A weight 17' is adjustable longitudinally in a conventional manner and for a known purpose on said upper end portion of plunger 17.

A frame 18 includes a transverse bottom plate 19 secured to a collar 20 which in turn is secured at the top end of tube 14. A knurled wheel 21 secured to sleeve 13 and having a central bore 21' coaxial with the bore of sleeve 13 and slidably and rotatably embracing tube 14 is manually rotatable to angularly adjust frame 18 and operatively associated parts in relation to handle 10 through connecting means to be described.

Said frame 18 comprises generally flat laterally spaced legs or side members including upright lower end parts 22 secured by screws 23 to brackets 24, FIG. 2, which brackets extend upwardly from said bottom plate 19. Said legs also include generally flat upright intermediate parts 25 and a transversely disposed member 45 which interconnects the lower ends of said parts 25 and the upper ends of said parts 22 in such manner that said parts 25 are positioned substantially in a plane at one side, i.e. front, of a plane parallel thereto and passing through the vertical axis of plunger 17; and the parts 22 are substantially in a plane at the opposite, i.e. rear, side of and parallel to said plane passing through said vertical axis of the plunger. In effect, said intermediate parts 25 are thus offset forwardly in relation to said lower parts 22 of frame 18. Frame 18 also includes a rearwardly inclined longitudinally bowed top piece 41, FIG. 2, which connects the upper ends of intermediate parts 25. A bridge or cross bar 38 disposed in a plane spaced forwardly from the plane of said parts 25 operatively connects laterally opposed portions of said parts 25.

A suitably calibrated scale 26 is secured to the front side of said top piece 41 as by screws 27 which also provide stop pins to limit the swing of an indicating pointer 28, said scale being inclined at an angle to enable a user to view the markings thereof from a position above the instrument.

Said pointer 28 which is provided at its lower end with a weighted arm 29 pivoted in a bracket 30 on the frame 18 extends upwardly with an upper end portion positioned between opposed upper end portions of said parts 25 and with the free end portion of said pointer 28 bent downwardly toward and into operative position adjacent to said scale 26, as seen in FIG. 2. Said arm 29 is positioned to be engaged at its underside by the top end of the plunger 17 in a known manner, or so that when the foot plate 15 is in place on an eyeball with the lower end 16 of the plunger resting on the cornea, axial displacement of said plunger due to pressure conditions in the eye will be transmitted to said arm 29 and the extent of said displacement will be indicated in magnified degree by the extent of lateral deflection of the free end of pointer 28 from a predetermined zero position in relation to scale 26.

To minimize the effect of friction in operation of this instrument, the several parts of the frame and tube assembly above described are arranged in a manner to produce substantial equilibrium around the central axis thereof or around an extension of the axis of said plunger; and a levelling element is provided to aid an operator in maintaining the axis of the instrument in substantially vertical relation to a plane tangent to that portion of the eyeball which is engaged by said lower end 16 of the plunger.

As seen more clearly in FIG. 2, the lower ends 22 of frame 18 are disposed in a plane parallel to and at the rear (right) of the plunger axis; the intermediate portions 25 are offset therefrom into a plane parallel to but at the front (left) of the upward extension of the plunger axis; and bridge 38 is in a plane spaced from that of said portions 25. Top piece 41 inclines rearwardly (right) with portions disposed, respectively, at both sides (front and rear) of said plunger axis. The distribution of weight of the frame 18 and connected parts is such that the center of gravity of the assembly thereof lies substantially in the plunger axis and below the level of the finger holds 31 of handles 11. As seen in FIGURE 1, the concave surface of said finger holds may advantageously be formed with concentric ridges 43 to ensure a more secure hold on the instrument.

To aid the operator in quickly and accurately positioning the tonometer on the eyeball and in maintaining it in proper relation (perpendicularly) thereto, a level 32 is supported on a rod 33 which in turn is mounted on and extends upward from knurled wheel 21 through a radial slot 34 in a peripheral portion of bottom plate 19, whereby, when wheel 21 is rotated, the tube and frame assembly is angularly adjusted in relation to handle 10.

An upper end portion of rod 33 extends through a guide hole 36 in arm 37 projecting forwardly (left, FIG. 2) from said bridge 38 which connects midportions 25 of the frame 18.

Level 32 is advantageously of the dry type wherein a freely rolling stainless steel ball 39 is mounted in a circular housing which encloses a base 40 having a highly polished ball supporting dished surface, as a segment of a sphere with a curvature corresponding to a radius of approximately 20 mm. A circular marking 44 on said surface and concentric with its central axis aids the operator in centering ball 39 when the instrument is in use.

A cover 42 of suitable transparent material, as glass, plastic or the like, confines the ball 39 within the enclosure while permitting free movement thereof on said dished surface.

From the foregoing description it appears that a tonometer embodying the novel features above noted will provide a substantially balanced instrument the vertically moving parts of which, in use with the foot plate 15 resting on an eyeball, usually on the cornea thereof, tend to reach the required perpendicularity unimpeded by friction due to imbalance. Also by observing the location of ball 39 in level 32, the operator can constantly maintain the desired operative or perpendicular position of the instrument on the cornea and thus ensure more accurate scale readings based on deflections of pointer 28 in relation to the markings on scale 26.

I claim:

In a tonometer of the type which comprises a handle, a frame rotatably supported on the handle and including a bottom plate and laterally spaced interconnected legs extending upwardly from said plate and including lower end parts in substantially the same plane, intermediate parts in another plane, and a top piece connecting the top ends of said intermediate parts, and each said leg having a front side and a rear side, a scale having markings exposed at the front side of said top piece, a pointer pivotally mounted on the frame with upper end portions of said pointer positioned to extend across and in operative relation to said markings, a foot plate tube mounted coaxially on and axially slidable in relation to said handle, and having a top end and a bottom end, said tube being secured at its top end to said bottom plate of the frame and having a foot plate at its bottom end, a plunger extending coaxially through and axially slidable in said tube and being arranged and adapted to actuate said pointer when the tonometer is held in substantially vertical position with said foot plate and the bottom end of the plunger resting on an eyeball, the combination wherein said plane of the intermediate parts of said legs of the frame is parallel with and offset forwardly from the plane of said lower parts of said legs, said plunger being operatively arranged with its axis in a plane substantially parallel with and between said planes of the lower end parts and intermediate parts respectively of said legs, and means for supporting a level in operative visual relation to said scale, said level supporting means including a post carrier which is mounted coaxially on and manually rotatable in relation to said handle, an upright post mounted on said carrier opposite the front of said frame, and a level mounted at the top end of said post adjacent to the front of said scale and opposite the front side of upper end portions of the frame, whereby, when the tonometer is in use, said scale, said pointer and said level are simultaneously effectively visible for reading values of pointer deflection on the scale while maintaining perpendicularity of the tonometer by reference to the level.

References Cited by the Examiner

UNITED STATES PATENTS

| | | | |
|---|---|---|---|
| 2,708,847 | 5/1955 | Esterman | 73—80 |
| 2,968,941 | 1/1961 | Papritz | 73—80 |
| 3,062,042 | 11/1962 | Gulden | 73—80 |

FOREIGN PATENTS 363,101   11/1922   Germany.

RICHARD C. QUEISSER, Primary Examiner.

JOSEPH P. STRIZAK, EDWARD P. FORGRAVE, J. JOSEPH SMITH, Examiners.